Aug. 15, 1967 A. MACOVSKI 3,336,585

ELECTRONIC MOTION DETECTOR

Filed April 5, 1965 2 Sheets-Sheet 1

INVENTOR
ALBERT MACOVSKI
BY Samuel Lindenberg
ATTORNEY

ELECTRONIC MOTION DETECTOR

Filed April 5, 1965 2 Sheets-Sheet 2

INVENTOR
ALBERT MACOVSKI
BY Samuel Lindenberg
ATTORNEY

United States Patent Office 3,336,585

Patented Aug. 15, 1967

3,336,585

ELECTRONIC MOTION DETECTOR

Albert Macovski, Palo Alto, Calif., assignor to Stanford Research Institute, Menlo Park, Calif., a corporation of California Filed Apr. 5, 1965, Ser. No. 445,556
7 Claims. (Cl. 340—258)

This invention relates to apparatus for detecting motion within a field of view and more particularly to an improved electronic arrangement for accomplishing this purpose.

An object of this invention is the provision of a simple and relatively inexpensive system for detecting the occurrence of movement within a field of view.

Yet another object of the present invention is the provision of a system which automatically indicates the ocmovement within a field of view.

Still another object of the present invention is the provision of a system which automatically indicates the occurrence of motion within a field of view.

These and other objects of this invention may be achieved in an arrangement wherein a vidicon camera tube is employed for scanning or looking at an area within which motion is to be detected. During the interval of scanning the area, a voltage is impressed on the vidicon target which has a rectangular waveshape and which is symmetrical about the zero axis. Thus, each element of the target which is illuminated will charge alternately to a positive and then toward a negative voltage with the average being zero. As a result, all elements of the vidicon camera tube target which are exposed to stationary or unchanged illuminated areas of the field being scanned are left uncharged. If, however, the illumination of an area changes by reason of a body or object moving during the time of scanning, a net charge remains on the target elements which are exposed to the area. On readout, this net charge may be used to indicate the occurrence of motion.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

The normal vidicon tube employed as a camera in television transmission systems, has a target made up of a plurality of elemental areas, each of which may be considered as a capacitor in series with a photoconductor. In the normal operation of the camera tube, each elemental area of the target charges toward an applied positive target voltage (of approximately 30 volts) through the photoconductor whose resistance varies inversely with the illumination level. The positive voltage attained at each element during a frame time is discharged by the electron beam. The discharge current flowing through the load resistor connected to the target electrode provides a video output signal.

Figure 1:
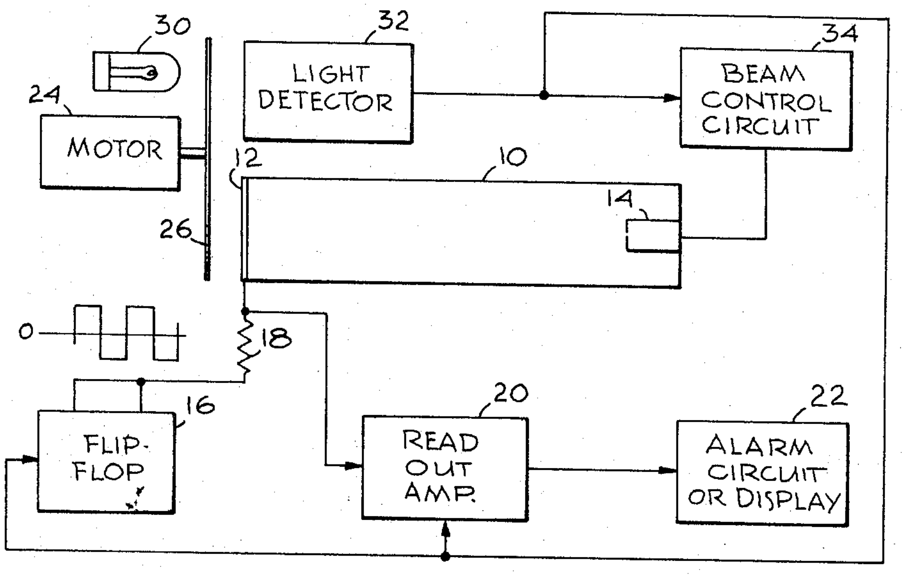
FIGURE 1 is a block schematic drawing of an embodiment of the invention.

Referring now to FIGURE 1 of the drawings, there may be seen a block schematic diagram of an embodiment of this invention. Therein is represented a vidicon camera tube 10 having a target 12 with the structure briefly described above. The electron gun 14 is in the end of the tube opposite the target 12. Not shown are the deflection electrodes normally employed for causing the electron beam emitted by the gun 14, during readout time, to scan the target 12. It will be understood that this scanning equipment is required. In accordance with this invention, instead of the usual DC voltage being applied to the target, there is applied a square wave voltage which is symmetrical about the zero axis. Accordingly, each illuminated target element will charge alternately toward the positive and negative voltage being applied, with the average being zero. Thus, all stationary areas on the target, that is areas which are illuminated by constant light remaining uncharged. If, however, the illumination of an area changes during the negative or positive half of the square wave, a net charge will remain, indicating motion in that portion of the scene.

A suitable structure for providing a square wave of voltage, which is symmetrical about a zero axis, is a flip-flop circuit 16. Its output is applied through the target load resistor 18 to the target 12. A readout amplifier 20 is connected to detect and amplify the output derived from the target 12. The readout amplifier 20, when it does detect an output can activate an alarm circuit 22, or display on a television monitor the areas which have moved.

Figures 2, 3:
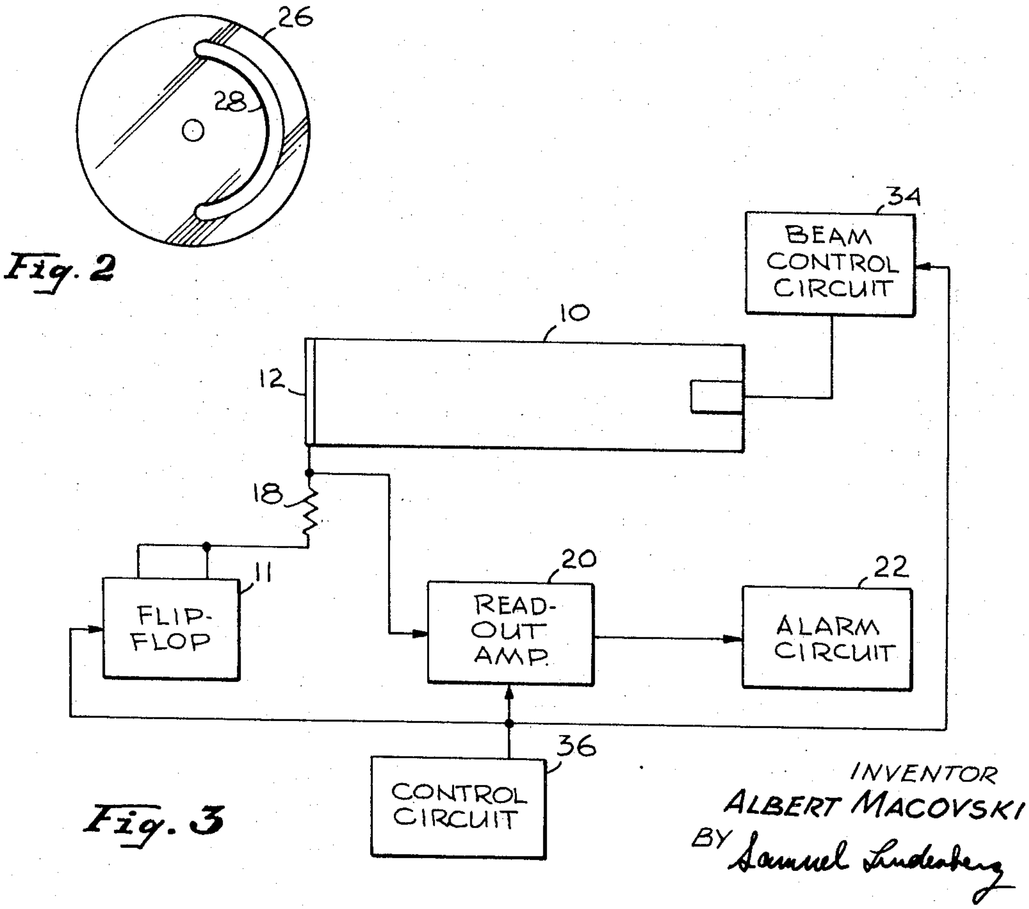
FIGURE 2 illustrates one form of a shutter which may be employed with the embodiment of the invention shown in FIGURE 1.
FIGURE 3 is a block schematic diagram of an embodiment of the invention which may be used where the scanning intervals are short.

A motor 24 rotates a shutter 26, which is shown in FIGURE 2. The shutter 26 has a slot or opening 28 therethrough whereby the vidicon tube can scan a desired region during the time the opening 28 is passing before the front of the tube and otherwise, during the remainder of the motion of the shutter no light is received from the target being scanned. The shutter 26 is rotatably driven by the motor 24 so that the periods of scanning and not scanning occur at a desired frequency. These can also be made to occur over a desired interval. It is, of course, within the scope of this invention to provide the openings 28 over several portions of the shutter 26 so that more than one scan and shuttering interval is made to occur during the rotation of the shutter 26.

A light 30 is positioned on one side of the shutter 26 and a light detector 32 is positioned on the other side of the shutter 26. The light detector may be any photocell and amplifier combination whose function is to produce a signal in response to receiving light from a lamp 30 coming through the opening 28 in the shutter 26, or through another opening specially provided for this purpose in the shutter. The signal from the light detector is applied to a beam control circuit 34, to bias it on whereby the electron gun 14 can provide a scanning electron beam, to the readout amplifier to bias it on, and to the flip-flop to bias it off. It should be appreciated that if a long readout interval is desired, it is preferable to block the view of the vidicon camera during readout to avoid changes during the readout interval. This operation is provided by the shutter 26 blocking the vidicon camera during the readout interval at which time the light detector is energized. Its output signal via the beam control circuit turns on the scanning electron beam, turns off the flip-flop circuit and turns on the readout amplifier. During the interval when the vidicon camera tube is scanning an area, the light detector does not provide an output signal whereby both the beam control circuit and the readout amplifier are inoperative and the flip-flop circuit 16 is operative. Any voltage which appears during the readout interval is amplified by the readout amplifier and then applied to actuate the alarm circuit 20 or to drive a display device which is synchronously scanned.

FIGURE 3 shows an arrangement which may be employed wtih short readout intervals. Similar functioning apparatus to that shown in FIGURE 1 bears the same reference numerals. With short readout intervals, no shuttering of the vidicon tube target is required. However, it is necessary to turn off the electron beam during a looking interval. This operation is performed by a control circuit 36. The control circuit may be a free runing unistable multivibrator, the output of which is applied to the beam control circuit 34 and the readout amplifier 20 for the purpose of activating these during a readout period, and to the flip-flop circuit 16 for inactivating it during the readout. During the intervals of no output from the control circuit, the flip-flop circuit applies a square wave signal to the target which is alternatively positive and negative. No shuttering is necessary during the readout interval since the target is at zero voltage during readout.

Figure 4:
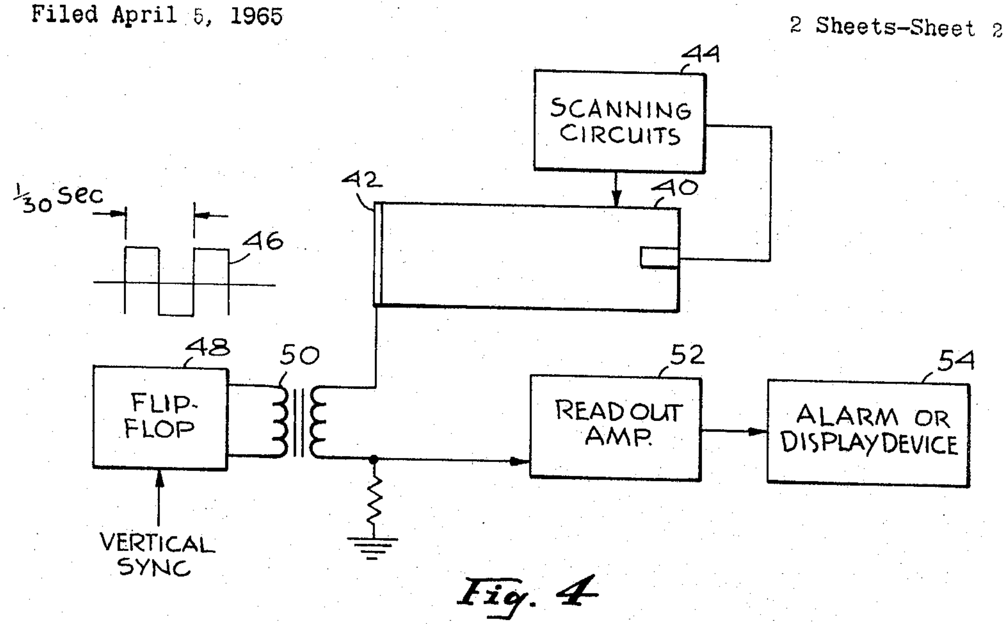
FIGURE 4 is a block diagram of the invention using continuous scanning.

FIGURE 4 shows an arrangement for this invention using the usual vidicon camera 40 with a target 42 used in television transmitting systems. Here the vidicon camera is continuously operated from scanning circuits 44, in the manner of television cameras. No shuttering is required if the square wave 46 is made synchronous with the television frame rate or at 30 c.p.s. Flip-flop circuit 48, which is synchronously driven by vertical sync pulses derived from the scanning circuits, produces the square wave 46 as its output. The output of flip-flop 46 is applied to the primary winding of a coupling transformer 50 to the target 42 of the vidicon tube 40. The secondary winding of the coupling transformer is connected in series with a load resistor 52. A readout amplifier 54 is connected to the load resistor 52. An alarm or readout device 54 is connected to receive the output of the amplifier. Each picture element on the vidicon screen will experience an equal duration of positive and negative excursions from the reference level between readout times. No control of the vidicon beam current is required. Transformer coupling is used to isolate the square wave signal from the video output.

The operation of the system is the same as was previously described.

Figure 5:
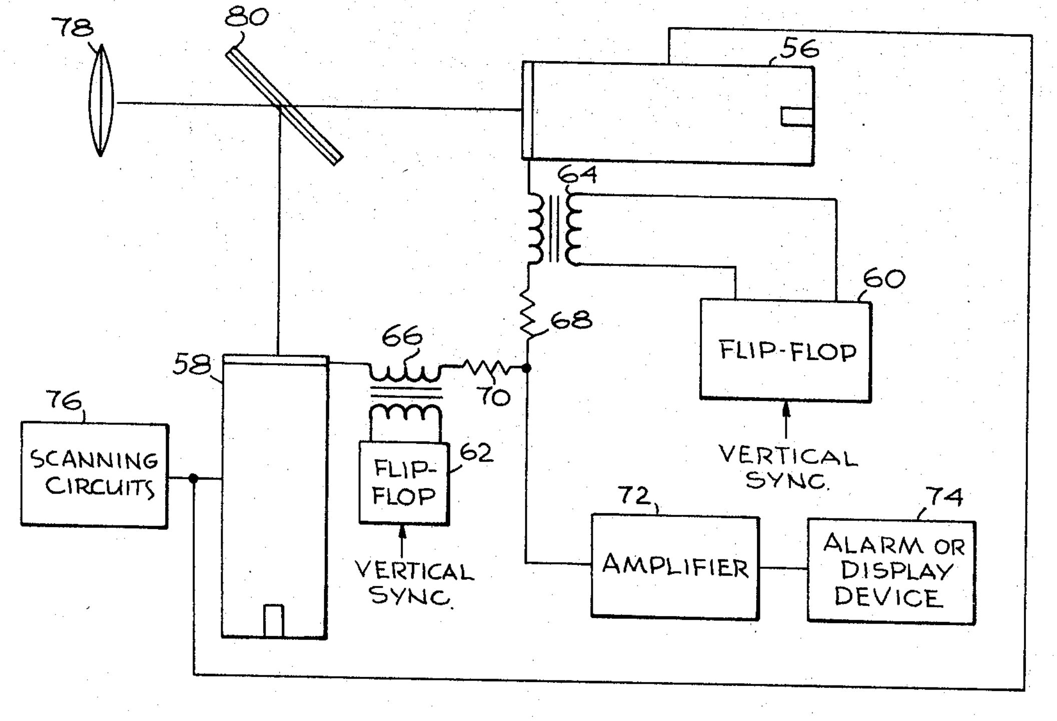
FIGURE 5 is a block diagram of an embodiment of the invention which aids in displaying moving information.

In the television motion detector which has been described, the target voltage is driven both positive and negative. If no light change occurs during the interval of the application of target voltage the resultant voltage stored by each target element is substantially zero. If a light change does occur during this interval, the resultant voltage is either positive or negative, depending on the nature of the light change. If the resultant voltage is positive, it will be read out by the vidicon beam. If it is negative, however, it will be ignored by the vidicon beam. To insure that all areas which have expereinced light changes are detected, rather than just those which remain positive, as is shown in FIGURE 5, two vidicons 56, 58 are used with opposite polarity square waves respectively applied from flip-flops 60, 62 through respective coupling transformers 64, 66 to their targets. The outputs are added together by joining the ends of target load resistors respectively 68, 70 together and connecting this to the amplifier 72, whose output is connected to indicator 74. The vidicons have a common set of scanning circuits 76. A lens 78 focusses light from the region being scanned on a half silvered mirror 80, which diverts a portion of this light to the target of vidicon 58 and transmits the remainder to the vidicon 56.

Because of the oppositely poled square waves applied to the respective vidicon targets, areas of light change which result in positive voltage on vidicon 1 will result in negative voltage on vidicon 2 and vice-versa. Thus, all areas of motion or light change will be reproduced in the video output with no output in areas of no change. This "two vidicon" arrangement which is shown in FIGURE 5 using the continuous television scan mode of operation, as was described in connection with FIGURE 4. The mode of operation shown and described in connection with FIGURES 1 or 3 may also be used, if desired.

There has accordingly been described and shown a novel, simple system for scanning an area and detecting whether or not motion has occurred thereover.

What is claimed is:

1. Apparatus for detecting the occurrence of motion occurring within a predetermined area comprising a vidicon tube having a target at one end and means for producing a scanning electron beam at the other end, means for generating a target potential having a wave shape which is symmetrical about a reference axis, means for applying said target potential to said vidicon tube target, and means for indicating the presence of a potential on said target.

2. Apparatus as recited in claim 1 wherein said target potential wave shape is rectangular and occurs at a frequency of 30 cycles per second.

3. Apparatus for detecting the occurrence of motion occurring within a predetermined area comprising first and second vidicon tubes each having a target at one end and means for producing a scanning electron beam at the other end, means for directing light from said predetermined area at the targets of said first and second vidicon tubes, first means for generating a first target potential which is symmetrical about a reference axis, second means for generating a second target potential which is symmetrical about a reference axis and is 180° out of phase with respect to said first target potential, means for respectively applying said first and second target potentials to said first and second target means for combining any output potentials which occur on said first and second targets, and means for indicating the presence of an output potential by said means for combining.

4. Apparatus for detecting the occurrence of motion occurring within a predetermined area comprising a vidicon tube having a target at one end and means for producing a scanning electron beam at the other end, means for generating a target potential having a wave shape which is symmetrical about a reference axis, means for applying said target potential to said vidicon tube target, means for rendering said scanning electron beam generating means inoperative while said target potential generating means is operative and for rendering said target potential generating means inoperative while said scanning beam generating means is operative, and means for indicating the presence of a potential on said target while said scanning electron beam generating means is operative.

5. Apparatus as recited in claim 4 wherein the wave shape of said target potential generated by said target potential generating means comprises a square wave which is substantially symmetrical about the reference axis.

6. Apparatus for detecting the presence of motion occurring within a predetermined area comprising a vidicon tube having a target at one end and a means for generating a scanning electron beam on the other end, said vidicon tube being positioned to have its target exposed to said predetermined area, means for generating a target potential having a wave shape which is symmetrical about a reference axis, means for applying said target potential to said vidicon target, means for alternatively preventing said vidicon target from being exposed to said predetermined area and for exposing said vidicon target to said predetermined area, means for generating a control signal during the intervals when said vidicon target is prevented from being exposed to said predetermined area, means for applying said control signal to said means for generating a scanning electron beam to render it operative and to said means for generating a target potential to render it inoperative, and means for indicating the presence of a potential on said vidicon target during the intervals when said means for generating a scanning electron beam is operative.

7. Apparatus for detecting motion within a predetermined area comprising a vidicon camera tube having a target at one end and a means for generating a scanning electron beam at the other end, a controllable means for generating a potential for said target having a square wave form and being symmetrical about a reference axis, means for coupling the output of said controllable means for generating a target potential to said vidicon target, means for periodically generating a control signal, means for applying said control signal to said controllable means for generating a target potential to render it inoperative and to said means for generating a scanning electron beam to render it operative, and means for indicating the presence of a signal on said vidicon target during the intervals while said controllable means for generating a scanning electron beam is operative.

References Cited

UNITED STATES PATENTS

| | | | |
|---|---|---|---|
| 2,473,893 | 6/1949 | Lyle | 178—6 |
| 2,982,816 | 5/1961 | Griengl | 178—7.2 |
| 3,114,797 | 12/1963 | Williams | 178—6 |

NEIL C. READ, *Primary Examiner.*

D. L. TRAFTON, *Assistant Examiner.*